United States Patent [19]

Itoh et al.

[11] 4,230,815

[45] Oct. 28, 1980

[54] SILICON-CONTAINING POLYBUTADIENE DERIVATIVES AND METHOD FOR THE PREPARATION THEREOF

[75] Inventors: Kunio Itoh; Kimitaka Kumagae, both of Annaka, Japan

[73] Assignee: Shin-Etsu Chemical Co., Ltd., Tokyo, Japan

[21] Appl. No.: 926,298

[22] Filed: Jul. 20, 1978

Related U.S. Application Data

[63] Continuation of Ser. No. 752,173, Dec. 20, 1976, abandoned.

[30] Foreign Application Priority Data

Dec. 23, 1975 [JP] Japan ................................ 50-153540

[51] Int. Cl.$^2$ ............................. C08F 8/00; C08F 8/42
[52] U.S. Cl. ..................................... 526/335; 556/487; 525/101; 525/333; 525/334; 525/342; 526/194; 526/340
[58] Field of Search ................. 526/29, 194, 335, 340; 260/448.2 B; 525/101, 333, 334, 342

[56] References Cited

U.S. PATENT DOCUMENTS

| | | | |
|---|---|---|---|
| 3,324,089 | 6/1967 | Trepka | 526/41 |
| 3,470,226 | 9/1969 | Plumb | 526/29 |
| 3,471,440 | 10/1969 | Ashby | 526/29 |
| 3,503,943 | 3/1970 | Kresge et al. | 526/29 |
| 3,657,206 | 4/1972 | Halasa | 526/29 |
| 3,764,592 | 10/1973 | Antonen et al. | 526/29 |
| 3,870,766 | 3/1975 | Chadka | 526/29 |
| 3,880,954 | 4/1975 | Kahle et al. | 526/29 |
| 3,881,536 | 5/1975 | Doran et al. | 526/29 |

*Primary Examiner*—William F. Hamrock
*Attorney, Agent, or Firm*—Toren, McGeady and Stanger

[57] ABSTRACT

Novel silicon-containing derivatives of polybutadiene or copolymers of butadiene with other copolymerizable monomer or monomers in which organosilicon-containing groups are bonded to the carbon atoms in the main chain of the butadiene polymers through the carbon-silicon linkages. These derivatives of butadiene polymers are produced by the addition reaction of an organosilicon compound having one hydrogen atom directly bonded to the silicon atom in the molecule to the double bonds in the butadiene polymers. They have a good fluidity, a small temperature dependency of viscosity, an excellent thermal stability and a high anti-oxidation resistance, as well as a good compatibility with siliceous fillers which are added to give improved workability and transparency to the compositions. The compositions to which a crosslinking agent and a curing catalyst are added can be cured into a rubber-like elastomer having excellent properties suitable for applications in various fields.

4 Claims, No Drawings

SILICON-CONTAINING POLYBUTADIENE DERIVATIVES AND METHOD FOR THE PREPARATION THEREOF

This is a continuation of application Ser. No. 752,173, filed on Dec. 10, 1976 now abandoned.

BACKGROUND OF THE INVENTION

This invention relates to a novel silicon-containing derivative of butadiene polymers and a method for the preparation of same.

The conventional liquid polymers of butadiene or liquid copolymers of butadiene with a comonomer, such as styrene or acrylonitrile, are unsatisfactory in their inferior thermal stability and anti-oxidation resistance, because they have unsaturated double bonds in the molecular structure which are susceptible to oxidation. It is known that improvements in the thermal stability and anti-oxidation resistance of butadiene polymers can be achieved to some extent by the hydrogenation of the double bonds, along with the improvement in the flexibility of cured and crosslinked forms of the polymers.

The hydrogenation of liquid butadiene polymers, however, brings about a considerable increase in their viscosity and in the temperature dependency of the viscosity to an extent such that practical applications of the hydrogenated polymers are unavoidably disadvantaged.

In addition, the incorporation of an inorganic filler, such as finely divided silica fillers, into the hydrogenated liquid butadiene polymers leads to a very much increased viscosity or consistency of the composition with eventual complete loss of the fluidity of the composition. Therefore, such a filler-impregnated hydrogenated butadiene polymer exhibits a very poor workability when it is employed in various applications, for example, molding, potting, encapsulation and coating of electric or electronic parts and devices and other applications where the polymer is to be cured by crosslinking and the composition should have a sufficient fluidity before the curing.

SUMMARY OF THE INVENTION

The inventors of the present invention have conducted extensive investigations to overcome the above disadvantages encountered in the conventional liquid polybutadiene and butadiene copolymers and established that a silicon-containing derivative of liquid polybutadiene or butadiene copolymers having in a molecule at least one silicon-containing group $R_3Si—$, where R is a substituted or unsubstituted monovalent hydrocarbon group or an organosiloxy group bonded to the carbon atom in the main chain of the butadiene polymers directly or through one or two carbon atoms by a silicon-carbon linkage, is very satisfactory in that is has a viscosity equal to or even remarkably lower than the viscosity of the starting butadiene polymer with no silicon atoms, in addition to the very small temperature dependency of the viscosity.

Furthermore, it has been discovered that a composition of such a silicon-containing polybutadiene derivative and a siliceous filler has a good workability, since increases in the viscosity or consistency of the composition are relatively small compared to the viscosity or consistency of unfilled polybutadiene derivatives and that the composition exhibits excellent thermal stability and anti-oxidation resistance especially at high temperatures, yielding products cured by crosslinking with superior flexibility and thermal stability.

According to the invention, such a silicon-containing derivative of butadiene polymers is readily produced by the addition reaction of an organosilicon compound having one hydrogen atom directly bonded to the silicon atom in the molecule to the double bonds in the polybutadiene or butadiene copolymers.

DETAILED DESCRIPTION OF THE PREFERRED EMBODIMENTS

In accordance with the present invention, the silicon-containing derivative of polybutadiene or butadiene copolymers can be produced by the addition reaction of an organosilicon compound with one Si-H linkage in the molecule to a polybutadiene or butadiene copolymer. The addition reaction is the so-called hydrosilation in which the organosilicon compound having a hydrogen atom directly bonded to the silicon atom reacts with the aliphatically unsaturated bonds in the butadiene polymers to form Si-C linkages.

The polybutadienes employed as the starting material for the production of the silicon-containing derivatives of the invention may be of unspecified types and irrespective of their degree of polymerization. They may be the so-called 1,2-polybutadiene expressed by the formula

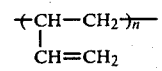

or 1,4-polybutadiene expressed by the formula $+CH_2—CH=CH-CH_2)_n$, symbol n in both formulas denoting the degree of polymerization, according to the method of the polymerization of butadiene. It is natural that both types of the monomer units, i.e., the 1,2-addition structure and the 1,4-addition structure, can be simultaneously present in the molecule of the polybutadiene.

The butadiene copolymer in accordance with the present invention is obtained by the polymerization of a monomer mixture composed of butadiene as the main (e.g. more than 50% by weight) component and a comonomer, such as styrene, acrylonitrile and the like. The terminal groups of the molecular chains of the polybutadiene or butadiene copolymers are also not limitative; they may be of $—CH_2OH$, $—COOH$, $—CH=CH_2$, $—NCO$, $—NH_2$ or the like. The method for introducing such terminal groups into the butadiene polymers is well known in the art.

The isocyanate terminal groups $—NCO$ are introduced by the reaction of a diisocyanate compound with the hydroxy groups at the terminals of the butadiene polymer molecules to form urethane linkages. Illustrative of the diisocyanate compounds for the purpose are 2,4- and 2,6-toluene diisocyanates, p-phenylene diisocyanate, hexamethylene diisocyanate, 1,5-naphthalene diisocyanate, 4,4'-diphenylmethane diisocyanate, dianisidine diisocyanate, m-xylene diisocyanate and the like. Among them 2,4- and 2,6-toluene diisocyanates, their mixtures, hexamethylene diisocyanate and 1,5-naphthalene diisocyanate are most widely employed.

The meaning of the "terminal groups" should not be understood in the strictest sense of the words, but these functional groups may be present in any positions within a molecule including, of course, the ends of the main chain of the butadiene polymers. Therefore the number of the terminal groups is not necessarily limited to two, but can be in the range of from 1.5 to 2.4 per molecule when, for example, the terminal groups are hydroxy groups, as is usually so in the commercially available hydroxy-terminated butadiene polymers.

In particular, when the terminal functional groups are brought into a crosslinking reaction using a suitable crosslinking agent to produce a cured product of the silicon-containing derivatives of the butadiene polymers in accordance with the invention, it is desirable that the starting butadiene polymer has at least two of such functional terminal groups in one molecule in order to achieve a sufficient degree of curing. Even otherwise, however, there are one or more possibilities to achieve a sufficient degree of crosslinking, for example, by introducing crosslinkable functional groups bonded to the silicon atoms in the silicon-containing groups to be bonded to the butadiene polymer molecules in accordance with the invention. For instance, one of the groups denoted by R in the formula $R_3Si$— of the silicon-containing group may be a chlorine atom or a hydrolyzable group which is subsequently hydrolyzed into a hydroxy group bonded to the silicon atom, which is crosslinkable by a method known in the art of silicones.

The organosilicon compounds to be brought into the addition reaction with the polybutadiene or copolymeric butadiene polymers have necessarily one and only hydrogen atom directly bonded to the silicon atom in one molecule, and they may be organosilanes or organopolysiloxanes having one silicon-bonded hydrogen atom in the molecule.

The organosilane in conformity with the above definition is represented by the general formula $HSiR_3^1$ where grops $R^1$ are each the same or different monovalent organic groups free of aliphatic unsaturation. Such monovalent hydrocarbon groups include alkyl groups, e.g., methyl, ethyl, propyl, butyl and octyl groups; arly groups, e.g., phenyl, tolyl, xylyl and naphthyl groups; and those groups which are obtained by replacement of the hydrogen atom or atoms in the above-mentioned alkyl or aryl groups by a halogen atom or atoms or a cyano group or groups. Examples of the organosilanes suitable for the purpose are trimethylsilane and phenyldimethylsilane.

Furthermore, one of the above groups $R^1$ may be a chlorine atom or a hydrolyzable group, such as an alkoxy, acyloxy or aminoxy group, which is subsequently hydrolyzed into a hydroxy group as a crosslinkable functional terminal group. Examples of such silane compounds are dimethylchlorosilane, phenylmethylchlorosilane and dimethylmethoxysilane.

The organopolysiloxane in conformity with the definition is expressed by the following general structural formulas.

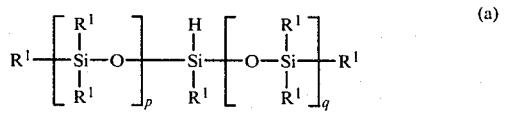

where p and q are each zero or positive integers with the proviso that (p+q) is not zero;

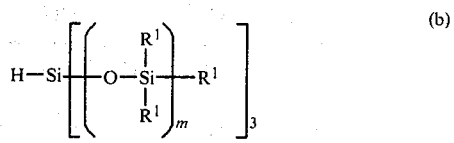

where m is the same or different positive integer;

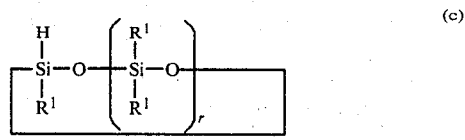

where r is an integer not smaller than 2.

In the above formulas, groups $R^1$ are the same as defined for the organosilanes. It is preferred that the organopolysiloxanes employed in the present invention have 10 or less silicon atoms in one molecule owing to their relatively high reactivity with the butadiene polymers. Several of the typical examples of these organopolysiloxanes with a silicon-bonded hydrogen atom are pentamethyldisiloxane, 1,1,1,3,5,5,5-heptamethyltrisiloxane, 1,1,3,3,5,5,5-heptamethyltrisiloxane, 1,1,3-trimethyl-3,3-diphenyldisiloxane, 1,1,1,3,3,5,7,7,9,9,9-undecamethylpentasiloxane and tris(trimethylsiloxy)silane.

It should be noted that organosilicon compounds with two or more hydrogen atoms directly bonded to the silicon stoms in the molecule are not suitable for use in the present invention, because they behave as a crosslinking agent bringing about gellation to the derivatives of the butadiene polymers prepared with them.

The addition reaction of the butadiene polymers with the organosilicon compounds is carried out by heating a mixture of these two kinds of starting materials with agitation under the atmospheric pressure or in a pressurized vessel. The temperature of heating is in the range from 60° to 200° C., preferably from 80° to 160° C. The vessel in which the reaction is carried out is not limited to a specially designed one, insofar as it is equipped with a stirrer operated, desirably, under pressure. Usually it is recommended that the reaction is carried out in an atmosphere of an inert gas, such as nitrogen gas, in order to prevent the oxidation reaction of the butadiene polymers. The oxidation reaction can be prevented more completely by the addition of an oxidation inhibitor to the reaction mixture.

The addition reaction between the butadiene polymer and an Si—H containing organosilicon compound can, advantageously, be accelerated by platinum or a platinum compound as the catalyst known in the art for the acceleration of the addition reaction between an aliphatically unsaturated compound and silicon-bonded hydrogen atoms. Such platinum catalysts are exemplified by platinum black, platinum-bearing alumina or silica catalysts, chloroplatinic acid, complexes of chloroplatinic acid with olefins and chloroplatinic acid modified with an alcohol.

The addition reaction of the silicon-bonded hydrogen atoms with the butadiene polymers lead to the silicon-containing derivatives in which the silicon-containing groups ($R_3Si$—) are bonded in different ways to the monomer units, as the starting butadiene polymer is a 1,2-polybutadiene or 1,4-polybutadiene. That is to say, and chromium oxide); oxidation inhibitors, such as alkylphenols and esters of higher alcohols; ultraviolet light absorbers, such as triazol compounds; stabilizers, such as benzoyl chloride; extenders, such as silicone fluids, paraffins and alkylnaphthalenes; silane coupling agents containing epoxy, amino or vinyl groups; and flame retardants, such as aluminum hydroxide and halogen- or phosphorus-containing organic compounds.

The following examples further illustrate the present invention. In the examples, the silicon-containing derivatives of butadiene polymers or copolymers, methods for the preparation of them and the compositions prepared from them will be described in detail.

EXAMPLE 1

Into a glass flask of 50 ml capacity were introduced 10 g of 1,2-polybutadiene Nisso PB B-1000 (product of Nippon Soda Co., Japan) of average molecular weight 1,000 with a viscosity of 6,200 centipoise at 25° C., 16.5 g of pentamethyldisiloxane and 0.01 g of a 2-ethylhexanol solution of chloroplatinic acid in a concentration of 5% by weight as platinum. The mixture was heated to 70° C. to initiate a reaction with agitation. The temperature once increased spontaneously to 82° C. by heat generated by the exothermic reaction at the early stage of the reaction, and the reaction was continued at 70° C. for an overall period of 5 hours. After the end of the reaction, the unreacted pentamethyldisiloxane was distilled off by heating at 100° C. under a reduced pressure of 5 mmHg to leave 26.3 g of a reaction product corresponding to 99.2% by weight of the starting materials.

The reaction product thus obtained had a viscosity of 3,130 centipoise at 25° C. and a definitely larger molecular weight than the starting polybutadiene as evidenced by analysis by gel permeation chromatography. On the other hand, the infrared absorption spectroscopy indicated the appearance of the absorption bands at 1,270, 1,070 and 850 cm$^{-1}$ each assigned to the siloxane linkages or Si-C linkages in place of the great diminution of the band at 975 cm$^{-1}$ and complete disappearance of the bands at 1,640, 1,000 and 920 cm$^{-1}$ each assigned to the double bonds in the 1,2-polybutadiene along with the complete absence of the absorption band at 2,130 cm$^{-1}$ assigned to Si-H linkages.

These analytical results evidenced the formation of a derivative of the polybutadiene by the addition of pentamethyldisiloxane to the double bonds of the 1,2-polybutadiene. It was calculated that 60.8% or 59.9% of the double bonds originally present in the starting 1,2-polybutadiene had become saturated by the addition reaction of the pentamethyldisiloxane from the results of the determination of the unsaturation and the weight increase of the product over the starting 1,2-polybutadiene, respectively.

EXAMPLE 2

Into a reaction vessel were introduced 6.9 g of 1,2-polybutadiene Nisso PB G-1000 (product of Nippon Soda Co., Japan) with an average molecular weight of 1,300 and a viscosity of 39,000 centipoise at 25° C., of which the content of double bonds being 1,730 moles per 100 g, 17.7 g of pentamethyldisiloxane and 0.02 g of the same chloroplatinic acid solution as in Example 1, to carry out a reaction at 70° C. under atmospheric pressure for 4 hours. At the early stage of the reaction, the temperature of the reaction mixture reached 86° C. After the end of the reaction, unreacted pentamethyldisiloxane was distilled off by heating at 100° C. under a reduced pressure of 5 mmHg to leave 23.5 g of a reaction product corresponding to 95.5% by weight of the starting materials.

This reaction product had a viscosity of 4,000 centipoise at 25° C. whereas the gel permeation chromatography indicated an increase in the molecular weight of it compared to the starting polybutadiene.

The determination of unsaturation indicated that 88.2% of the double bonds originally present in the starting polybutadiene had been saturated by the addition of the pentamethyldisiloxane, and the infrared absorption spectroscopy gave a result leading to the same conclusion as in the preceding example.

EXAMPLE 3

A mixture of 100 g of hydroxy-terminated copolymer Poly bd CS-15 (product of Idemitsu Petrochemical Co., Japan) composed of 75 mole % of 1,4-polybutadiene units and 25 mole % of polystyrene units with an average molecular weight of 3,600 and a viscosity of 15,000 centipoise at 25° C., of which the content of double bonds was 1.732 moles per 100 g, 84.5 g of pentamethyldisiloxane and 0.05 g of the same chloroplatinic acid solution as in the preceding examples was heated in an autoclave at 150° C. under a pressure of 1 kg/cm$^2$G for 8 hours. The reaction mixture initially with turbidity became clear after 1 hour of the heating. After the end of 8 hours of the reaction, unreacted pentamethyldisiloxane was distilled off in the same manner as in Example 2 to leave 183.5 g of a reaction product corresponding to 99.5% by weight of the starting materials. The viscosity of the product was 11,300 centipoise at 25° C. and the refractive index was 1.4863.

The addition reaction of the pentamethyldisiloxane to the butadiene copolymer was supported by an increase in the molecular weight of the product over the starting copolymer indicated by the gel permeation chromatography and by the results of the infrared absorption spectroscopy in which the disappearance of the absorption band at 1,640 cm$^{-1}$ and the remarkable decrease of the bands at 950, 970 and 910 cm$^{-1}$ each assigned to the double bonds along with the appearance of the bands at 1,260, 1,060 and 840 cm$^{-1}$ each assigned to the siloxane linkages or Si-C linkages was recognized in comparison with the infrared absorption spectrum of the starting copolymer. The determination of unsaturation gave a result that 52.1% of the double bonds originally present in the starting copolymer had been saturated by the addition of the pentamethyldisiloxane. Incidentally no absorption band to be assigned to the Si-H linkages was found in the infrared spectrum of the product.

EXAMPLE 4

A mixture composed of 100 g of 1,4-polybutadiene Polyoil 110 (product of Hüls A.-G., West Germany) with an average molecular weight of 1,600 and a viscosity of 600 centipoise at 25° C., 137.7 g of pentamethyldisiloxane and 0.05 g of the same chloroplatinic acid solution as in the preceding examples was heated in an autoclave at 110° C. under a pressure of 1.5 kg/cm$^2$G for 6 hours. After the end of the above reaction time, the unreacted pentamethyldisiloxane was distilled off by heating at 100° C. under a reduced pressure of 5 mmHg to leave 197.4 g of a reaction product corresponding to 83.0% by weight of the starting materials. This reaction product had a viscosity of 750 centipoise at 25° C. and a refractive index of 1.4770. The gel permeation chromatography and the infrared absorption spectroscopy led to the same conclusion as in Example 3 and the determination of the unsaturation indicated that 35.0% of the double bonds originally present in the starting butadiene polymer had been saturated by the addition of pentamethyldisiloxane.

EXAMPLE 5

A mixture composed of 50 g of the same butadiene polymer as employed in Example 2, 150 g of 1,1,1,3,5,5,5-heptamethyltrisiloxane (herein after referred to as "trisiloxane" for brevity) and 0.02 g of the same chloroplatinic acid solution as in the preceding examples was heated at 140° C. under atmospheric pressure for 14 hours. The reaction mixture which had been turbid before heating became clear after 1 to 2 hours of heating. After the end of the above reaction time, the unreacted trisiloxane was distilled off in the same conditions as in Example 4 to leave 160.8 g of a reaction product corresponding to 80.0% by weight of the starting materials. This reaction product had a viscosity of 12,800 centipoise at 25° C. and gel permeation chromatography was also conducted to show the increase in the molecular weight of the product over the starting butadiene polymer. The determination of the unsaturation indicated that 61.2% of the double bonds originally present in the starting butadiene polymer had been saturated by the addition of the trisiloxane. The infrared absorption spectroscopy indicated the decrease of the four absorption bands assigned to the double bonds and the appearance of the absorption bands assigned to the siloxane linkages or Si-C linkages with no absorption band assigned to the Si-H linkages.

EXAMPLE 6

A mixture composed of 50 g of a highly viscous 1,2-polybutadiene acrylic-modified at the molecular terminals Nisso PB TE-2000 (product of Nippon Soda Co., Japan) with an average molecular weight of 2,600, 41.4 g of the trisiloxane and 0.03 g of the same chloroplatinic acid solution as employed in the preceding examples was heated at 100° C. under atmospheric pressure for 9 hours. The reaction mixture which had been turbid before heating became clear after 1 to 2 hours of heating. After the end of the above reaction time, the unreacted trisiloxane was distilled off by heating at 80° C. under a reduced pressure of 3 mmHg to leave 83.2 g of a reaction product corresponding to 91.4% by weight of the starting materials. It was calculated from this yield of the product that 24.0% of the double bonds originally present in the starting butadiene polymer had been saturated by the addition of the trisiloxane and the gel permeation chromatography for the product also indicated an increase in the molecular weight over the starting butadiene polymer. The infrared absorption spectroscopy gave a result that the absorption band at 1,640 cm$^{-1}$ assigned to the double bonds decreased in parallel with the appearance of the absorption bands at 1,260, 1,050 and 840 cm$^{-1}$ each to be assigned to the siloxane linkages or Si-C linkages. No absorption band assigned to the Si-H linkages was found in the infrared spectrum.

EXAMPLE 7

A mixture composed of 50 g of the same butadiene polymer was employed in Example 2, 54.8 g of the trisiloxane and 0.02 g of the same chloroplatinic acid solution as in the preceding examples was heated at 140° C. under atmospheric pressure for 9 hours. The clarity of the reaction mixture exhibited much the same trend as in Example 6. The removal of the unreacted trisiloxane was conducted similarly to leave 96.1 g of a reaction product with a viscosity of 16,000 centipoise at 25° C. and an increased average molecular weight as indicated by the gel permeation chromatography. The determination of the unsaturation for the product indicated that 39.0% of the double bonds originally present in the starting butadiene polymer had been saturated by the addition of the trisiloxane. The results of the infrared absorption spectroscopy were much the same as in Example 5.

EXAMPLE 8

Into an autoclave of 2,000 ml capacity were introduced 100 g of the same butadiene polymer as employed in Example 2, 1,400 g of pentamethyldisiloxane, 0.01 g of a 2-ethylhexanol solution of chloroplatinic acid in a concentration of 2% by weight as platinum and 0.1 g of an oxidation inhibitor Antage-BHT (product of Kawaguchi Chemical Co., Japan). The mixture was heated at 120° C. with agitation under a pressure of 5 kg/cm$^2$G for 10 hours. After the end of the above reaction time, the reaction mixture was taken out of the autoclave and subjected to distillation to remove unreacted pentamethyldisiloxane at 100° C. under a reduced pressure of 5 mmHG to leave the reaction product weighing about 306 g, of which the content of silicon was 25.38% and the number average molecular weight was 4,200.

The silicon-containing derivative of the butadiene polymer thus obtained was analyzed for unsaturation with a result of 0.1133 mole of double bonds per 100 g. It was calculated from this result that 80% of the double bonds originally present in the starting butadiene polymer had been saturated by the addition of the pentamethyldisiloxane. This silicon-containing derivative of the butadiene polymer had very much lower viscosity than the starting butadiene polymer as shown in Table I. Thermal stability of this product was examined by keeping it in an air oven at 100°, 120° or 150° C. with the results as shown in the table. For comparison, the measurement of viscosity and the test for the thermal stability were undertaken on the starting polybutadiene in the same manner with the results also shown in the table.

TABLE I

|  | Present Invention | Control |
|---|---|---|
| Viscosity: |  |  |
| at 20° C. | 8,500 centipoise | 70,000 centipoise |
| at 30° C. | 6,000 centipoise | 25,000 centipoise |
| at 50° C. | 3,000 centipoise | 3,000 centipoise |
| at 100° C. | 600 centipoise | — |
| Thermal stability: |  |  |
| at 100° C. | Stable after 150 hours | Film was formed on the surface by oxidation within 24 hours. |
| at 120°C. | Stable after 150 hours | Film was formed on the surface by oxidation within 24 hours. |
| at 150° C. | Partially gelled after 50 hours | Film was formed on the surface by oxidation within 24 hours. |

EXAMPLE 9

Into an autoclave of 1,000 ml capacity were introduced 100 g of the same butadiene copolymer as emthe silicon-containing derivatives obtained from 1,4-polybutadiene have at least one monomer unit in one molecule, in which the silicon-containing group is bonded to the carbon atom in the main chain in the manner as expressed by the formula

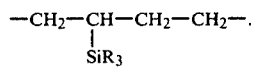

The derivatives obtained from 1,2-polybutadiene have at least one monomer unit in one molecule, in which the silicon-containing group is bonded to the carbon atom in the main chain through one or two intervening carbon atoms in the manner as expressed by the following formulas.

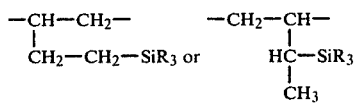

The advantages of the silicon-containing derivatives of butadiene polymers in accordance with the present invention over the conventional butadiene polymers are well exhibited when the extent of the addition reaction is such that more than 15%, preferably 40% of the double bonds originally present in the starting butadiene polymer have been saturated by the addition of the organosilicon compound with a silicon-bonded hydrogen atom in the molecule. In other words, more than 15%, preferably 40% of the butadiene monomer units on an average are the silicon-bearing monomer units and the molar ratio of the silicon-bearing monomer units to the remaining double bonds is larger than 15:85 or, preferably, than 40:60.

In order that the addition reaction proceeds to such high extent, it is recommendable that the proportion of the starting materials to be brought into the reaction is so formulated that the amount of the organosilicon compound is in excess over the stoichiometric amount calculated from the intended degree of addition and in a large excess especially when a derivative with a very high degree of the addition reaction is to be obtained.

After completion of the addition reaction, the desired silicon-containing derivative of the butadiene polymer is isolated from the reaction mixture by removing unreacted organosilicon compound by distillation under reduced pressure or some other means following, if necessary, filtration. The finished products can be identified by an analytical means, such as, elementary analysis of the constituent elements including silicon, infrared absorption spectroscopy, or determination of aliphatic unsaturation along with certain physical or physicochemical measurements of the parameters, i.e., viscosity, refractive index, increases in the average molecular weight and the like. For example, the infrared absorption spectra of the products have absorption bands assigned to the double bonds in the starting butadiene polymers decreased to a large extent or even disappeared, while absorption bands assigned to the Si-C linkages appear in the spectrum. Further, the refractive index of a product is generally smaller than that of the butadiene polymer employed as the starting material.

It is sometimes advisable that the reaction products obtained by the addition reaction of the organosilicon compound having a silicon-bonded hydrogen atom with the butadiene polymers having hydroxy groups as the terminal groups will be subjected to hydrolysis with an acid when the product is to be brought into curing by the terminal hydroxy groups, because part of the hydroxy groups have been lost by a dehydrogenation condensation reaction between the hydroxy groups and the silicon-bonded hydrogen atoms to form Si—O—C linkages, from which hydroxy groups can be regenerated by the hydrolysis.

The characteristic advantages of the silicon-containing derivatives of butadiene polymers of the present invention over the conventional butadiene polymers may be understood by the mechanisms as the following. Firstly, improvements in thermal stability as well as in anti-oxidation resistance are consequent on the decrease of aliphatic unsaturation and the protection of the C—C linkages in the main chain of the butadiene polymer by being surrounded with the silicon-containing groups, which are highly heat-resistant in themselves, bonded to the molecules of the butadiene polymers by the addition reaction. Secondly, the inherent bulkiness of the silicon-containing groups bonded to the molecules of the butadiene polymers brings about decreases in the intermolecular cohesion which in turn leads to the smaller temperature dependency of the viscosity, the sufficient fluidity of the composition of the silicon-containing derivative with incorporated siliceous fillers and the satisfactory flexibility of the cured products obtained therefrom.

An additional advantage of the silicon-containing derivateve of butadiene polymers of the present invention may be such that the compositions obtained by incorporating siliceous fillers into the derivative have a high transparency in contrast to similar compositions prepared from the conventional butadiene polymers having in most cases little fluidity and a white and opaque appearance.

The silicon-containing derivatives of butadiene polymers in accordance with the present invention are capable of producing elastic or rigid, depending on the density of crosslinkage, cured products having a higher flexibility than corresponding cured products obtained from the starting butadiene polymers. The crosslinking of the derivatives of the invention can be effected in various ways. For example, an organic peroxide acts as a curing agent when the derivatives of butadiene polymers admixed with the organic peroxide are heated. Alternatively, an organohydrogenpolysiloxane with two or more of hydrogen atoms directly bonded to the silicon atoms in the molecule behaves as a crosslinking agent by forming crosslinks between the double bonds remaining in the derivatives of butadiene polymers. Further, the terminal groups, such as hydroxy groups, in the molecules of the derivatives of butadiene polymers serve as the functional groups for crosslink formation by reacting with various kinks of reactive compounds, such as isocyanate compounds, alkoxysilanes, partial hydrolysis-condensates thereof and the like. Similarly a silicon-containing derivative having isocyanate groups—NCO as the terminal groups can be crosslinked by various reactive compounds including polyols, such as glycerin and pentaerithritol, as the crosslinking agent.

It is a further advantage of the silicon-containing derivatives of butadiene polymers of the present invention that they can easily be cured by an organic peroxide, compared to the conventional hydrogenation wherein butadiene polymers have decreased unsaturation in the molecules and hence improved thermal stability and anti-oxidation resistance but are, disadvantageously, very difficult to be crosslinked in the presence of an organic peroxide due to the decreased unsaturation.

The silicon-containing derivatives of butadiene polymers of the present invention are useful in a variety of fields, especially in the form of a composition with a siliceous filler and a crosslinking agent. Other additives, such as inorganic fillers other than siliceous fillers, coloring agents (e.g. pigments and dyes), flame retardants and anti-oxidants may be used for the desired compositions. The derivatives of butadiene polymers of the invention have a good miscibility with organopolysiloxane fluids to form homogeneous blends, which as such also can find various uses.

Taking the advantage of the silicon-containing derivatives of butadiene polymers of the present invention as described hereabove, they are applied in the form of composition in most cases. Proposed fields of application include adhesive, sealing, calking, coating, electric insulation by potting, encapsulation or casting, roofing, dental and medical uses, cooking and sanitary wares, toiletary, and the manufacture of articles, such as belts, hoses, packings, gaskets and solid tires.

Typical formulation of the curable composition suitable for the above purposes comprises (a) 100 parts by weight of the silicon-containing derivative of butadiene polymers of the invention, (b) from 0.01 to 100 parts by weight of a curing agent and optionally, (c) a filler in an amount up to 900 parts by weight.

The silicon-containing derivative of butadiene polymers as component (a) must have at least two crosslinkable terminal groups per molecule, which may preferably be hydroxy groups or isocyanate groups.

The curing agent as component (b) is either a crosslinking agent capable of forming crosslinkages by reacting with the terminal groups in component (a) or a curing catalyst capable of accelerating the crosslinking reaction of component (a), or a combination of both. The crosslinking agent is employed in an amount of from 1 to 100 parts by weight, while the curing catalyst is employed in an amount of from 0.01 to 5 parts by weight per 100 parts by weight of component (a), depending on the combination of component (a) and the curing agent. When the terminal groups in component (a) are hydroxy groups, one class of the crosslinking agents consists of polyfunctional isocyanate compounds, exemplified by 2,4- and 2,6-toluene diisocyanates, mixtures thereof, hexamethylene diisocyanate, 1,5-naphthalene diisocyanate and the like. These polyfunctional isocyanate compounds may be used in combination with polyol compounds, diamine compounds, aminoalcohols or dicarboxylic acids as a chain-length extender or a crosslinking agent by themselves, such as bisphenol A, derivatives thereof, 1,4-di-hydroxyethoxy benzene, N,N-bis(2-hydroxypropyl)aniline, 3,3'-dichlorobenzidine, N,N'-bis(1,4-dimethylpentyl)-p-phenylenediamine and the like.

The crosslinking agents for component (a) with terminal hydroxy groups belonging to another class are silicon compounds having two or more of hydrolyzable groups bonded to the silicon atoms in a molecule, such as, alkoxysilanes, alkoxypolysiloxanes, acyloxysilanes, acyloxypolysiloxanes, aminosilanes, aminopolysiloxanes, aminoxysilanes, aminoxypolysiloxanes, ketoximesilanes, ketoximepolysiloxanes and the like. Their examples are ethyl orthosilicate, propyl orthosilicate, phenyl triethoxysilane, tris(2-methoxyethoxy)vinylsilane, triacetoxymethylsilane, triacetoxyvinylsilane, tris(diethylamino)methylsilane, tris(diethylaminoxy)methylsilane, tris(dimethylketoxime)methylsilane, tris(methylethylketoxime)methylsilane, tris(methylethylketoxime)-vinylsilane, 1,3,5,7-tetramethyl-1-propyl-3,5,7-tri(diethylaminoxy)cyclotetrasiloxane and partial hydrolysis-condensates thereof. The molar ratio of the terminal hydroxy groups in component (a) to the functional groups in these silicon compounds as the crosslinking agent is preferably in the range of from 0.8 to 10.0 or, more preferably, from 1.2 to 5.0.

Component (a) terminated with isocyanate groups is crosslinked by various polyfunctional compounds, including amine compounds, polyol compounds, polycarboxylic acids and the like, exemplified by ethylenediamine, diethylenetriamine, phenylenediamines, benzidine, 3,3'-dichlorobenzidine, N,N-bis(2-hydroxypropyl)aniline, ethyleneglycol, diethyleneglycol, 1,4-di(hydroxyethoxy) benzene, bisphenol A, derivatives thereof, oxalic acid, malonic acid, succinic acid, adipic acid, maleic acid, fumaric acid, phthalic acid, $\Delta,\omega$-dihydroxyalkyldimethylpolysiloxanes, trimethylolpropane, pentaerithritol and polyoxyethylenepolyols. The molar ratio of the isocyanate groups in component (a) to the functional groups in the above crosslinking agent is preferably in the range of from 0.6 to 1.5 or, more preferably, from 0.8 to 1.3.

The curing catalyst should be selected in accordance with the mechanism of the crosslinking reaction of component (a) or between components (a) and the crosslinking agent. For instance, the reaction of the isocyanate compounds as the crosslinking agent can be accelerated by acid catalysts, such as butadienesulfonic acid and inorganic acids; basic catalysts, such as amines, e.g. triethylenediamine; and metal compounds, e.g. dibutyltin dilaurate and tin dioctoate. The reaction of the hydrolyzable silicon compounds as the crosslinking agent can be accelerated by a metal compound, such as dibutyltin dilaurate, tin dioctoate, dibutyltin diacetate and lead dioctoate with, optionally, a cocatalyst, such as alkyl titanates. Suitable selection of the curing catalyst serves to afford a reasonable velocity of curing to the compositions at relatively low temperatures down to room temperature.

The fillers as component (c) are used when their use is directed not to transparency of the composition, but to improvements in mechanical, electric and other physical properties, decreases in the shrinkage, increases in the heat conductivity and decreases in the cracking tendency, of the composition as well as reductions in the cost of the resulting product.

The fillers suitable for the above purposes are either organic or inorganic, and include polyethylene, polyvinyl chloride, fluorine-containing polymers, polybutadienes, cellulose, cellulose derivatives, carbon black, quartz, fumed silica, precipitated silica, diatomaceous earth, talc, clay, alumina, calcium carbonate and magnesium carbonate, zinc oxide in the form of powder and also glass beads, glass microspheres and glass fibers. Among them, the most preferred are the siliceous fillers, which serve to afford a sufficient transparency to the composition, and bring about a greater affinity between those fillers and the silicon-containing butadiene polymers and good workability of the composition.

Other optional additives to be incorporated in the composition include coloring agents, such as dyes and pigments (e.g. titanium dioxide, iron oxide, cobalt oxide, ployed in Example 3, 300 g of pentamethyldisiloxane, 0.02 g of the same chloroplatinic acid solution as in Example 8 and 0.1 g of the same oxidation inhibitor as in Example 8. The mixture was heated at 150° C. with agitation under a pressure of 3 kg/cm²G for 8 hours. After the end of the above reaction time, the resulting unreacted pentamethyldisiloxane was distilled off by heating at 100° C. for 2 hours under a reduced pressure of 5 mmHg to leave 230 g of a reaction product with a silicon content of 21.28% and a number average molecular weight of 8,300. Determination of unsaturation was conducted for this silicon-containing derivative of the butadiene copolymer to give a result of 0.1072 mole of the double bonds per 100 g, from which it was calculated that 78% of the double bonds originally present in the starting butadiene copolymer has been saturated by the addition of the pentamethyldisiloxane.

The properties of the silicon-containing derivative of the butadiene copolymer thus obtained are shown in Table II. In the table, the test for thermal stability was carried out in the same manner as in Example 8 and the fluidity was for the compositions obtained by incorporating 20 parts by weight of a fumed silica Silanox 101 (product of Cabot Corp.) having surfaces blocked with trimethylsiloxy groups to improve the affinity with the matrix material into 100 parts by weight of the silicon-containing derivative above obtained, followed by milling in a paint roller.

For comparison, similar testing procedures were undertaken for the starting butadiene copolymer Poly bd CS-15 as it was, to give the results also shown in the table.

TABLE II

|  | Present Invention | Control |
|---|---|---|
| Viscosity at 25° C. | 22,000 centipoise | 17,000 centipoise |
| Refractive index at 20° C. | 1.470 | 1.528 |
| Thermal stability: | | |
| at $\phi$° C. | Stable after 200 hours | Film was formed on the surface by oxidation within 20 hours. |
| at 120° C. | Stable after 200 hours | Film was formed on the surface by oxidation within 20 hours. |
| at 150 ° C. | Film was formed on the surface by oxidation after 20 hours. | Film was formed on the surface by oxidation after 20 hours. |
| Silica-filled composition: | | |
| Transparency | Good | Opaque |
| Fluidity | Yes | No |

EXAMPLE 10

Into an autoclave of 1,000 ml capacity were introduced 100 g of the 1,2-polybutadiene, 0.05 g of the chloroplatinic acid solution, 0.1 g of the oxidation inhibitor, each being the same as employed in Example 8, and 330 g of the trisiloxane. The mixture was heated at 100° C. for 8 hours with agitation. After the end of the above reaction time, the resulting unreacted trisiloxane was distilled off by heating at 100° C. for 2 hours under a reduced pressure of 5 mmHg to leave 346 g of a reaction product containing 26.90% of silicon. Determination for unsaturation gave a result of 0.1801 mole of the double bonds per 100 g from which it was calculated that 64% of the double bonds originally present in the starting butadiene polymer had been saturated by the addition of the trisiloxane. The product had a viscosity of 15,000 centipoise at 20° C. and a number average molecular weight of 4,800. The thermal stability of the product was tested in the same manner as in Example 8 to give a result that it was stable after 100 hours of heating at 100° or 120° C. but it was yellowish after 24 hours and partly gelled after 100 hours when the heating temperature was increased to 150° C.

EXAMPLE 11

Into an autoclave of 1,000 ml capacity were introduced 100 g of the 1,2-polybutadiene, 0.02 g of the chloroplatinic acid solution, 0.1 g of the oxidation inhibitor, each being the same as employed in Example 8, and 150 g of trimethylsilane, and the mixture was heated at 100° C. for 6 hours with agitation under a pressure of 8 kg/cm²G. After the end of the above reaction time, the reaction mixture was taken out of the autoclave and the resulting unreacted trimethylsilane was distilled off by heating at 80° C. for 2 hours under a reduced pressure of 5 mmHg to leave 189 g of a reaction product containing 17.62% of silicon. Determination of unsaturation in this reaction product gave a result of 0.2961 mole of the double bonds per 100 g from which it was calculated that 68% of the double bonds orginally present in the starting butadiene polymer had been saturated by the addition of the trimethylsilane. The reaction product thus obtained had a viscosity of 35,000 centipoise at 20° C. and the test for the thermal stability of the product carried out in a hot air oven in the same manner as in Example 8 gave a result that it was stable after 150 hours of heating at 120° C.

EXAMPLE 12

Into an autoclave of 1,000 ml capacity were introduced 100 g of the butadiene copolymer, 0.02 g of the chloroplatinic acid solution, 0.1 g of the oxidation inhibitor, each being the same as employed in Example 9, and 50 g of trimethylsilane and the mixture was heated at 100° C. for 8 hours with agitation under a pressure of 8 kg/cm²G. After the end of the above reaction time, the resulting unreacted trimethylsilane was distilled off by heating at 80° C. for 2 hours under a reduced pressure of 5 mmHg to leave 135 g of a reaction product containing 9.75% of silicon with a viscosity of 52,000 centipoise at 20° C. and a number average molecular weight of 4,900. The determination of the unsaturation of the product gave a result of 0.4809 mole of the double bonds per 100 g, from which it was calculated that 42% of the double bonds originally present in the starting butadiene polymer had been saturated by the addition of the trimethylsilane. This reaction product was stable after 150 hours of heating at 120° C. in the test for the thermal stability as in Example 8.

A pasty composition with sufficient fluidity was prepared by blending 2 g of tris(dimethylhydrogensiloxy)-phenylsilane, 0.1 g of the same chloroplatinic acid solution as employed above and 100 g of quartz powder with an average particle size of 5 μm into 100 g of the silicon-containing derivative of the butadiene polymer above obtained. The pasty composition was poured over an iron plate of 30 mm×30 mm wide and 3 mm thick placed at the center of the bottom of a dish of aluminum with 60 mm inner diameter and 10 mm depth so as that the iron plate was wholly covered with the composition.

Thereafter, this test sample was heated at 120° C. for 8 hours to cure the pasty composition into a rubbery elastomer. Thermal aging test was performed by subjecting the test sample to 10 cycles of repeated heating and cooling between 120° C. and −40° C., to find no cracks produced in the layer of the cured composition.

EXAMPLE 13

The reaction product obtained in Example 9 was subjected to a hydrolysis treatment with an acid as follows. Into a mixed solvent composed of 200 g of toluene, 200 g of isopropyl alcohol and 100 g of acetic acid was put 100 g of the above product to dissolve, and the resulting solution was heated with 59 g of 35% hydrochloric acid at 50° C. for 3 hours with agitation. Then the organic layer was separated from the aqueous layer, washed with water to neutral and stripped of the solvents by heating at 100° C. under a reduced pressure of 5 mmHg. The hydroxy-content of the thus obtained hydroxy-regenerated product was 0.025 mole per 100 g whereas the hydroxy content of the product before this hydrolysis treatment was a few thousandths of a mole per 100 g and the theoretical hydroxy content was 0.028 mole per 100 g.

Into 100 g of the above hydroxy-regenerated product were admixed 2.7 g of toluene diisocyanate and 0.3 g of dibutyltin dilaurate, and the blend was freed of foam and then subjected to cure by heating at 100° C. for 90 minutes to form a sheet. For comparison, a similar sheet was prepared with the butadiene copolymer Poly bd CS-15 as such in the same manner as above with the exception of the increase in the amount of toluene diisocyanate to 6.1 g instead of 2.7 g.

The results of the mechanical testing of these sheet samples were the following. The value of hardness mentioned hereinafter was determined in accordance with the Japanese Industrial Standard.

|  | Present Invention | Control |
|---|---|---|
| Hardness | 15 | 30 |
| Tensile strength, kg/cm$^2$ | 6 | 7 |
| Elongation at break, % | 220 | 300 |

Upon heating at 150° C. for a week in an air oven, the test sheet for control became remarkably colored and lost its rubber-like elasticity with increased hardness, whereas the test sheet in accordance with the present invention became hardly colored and retained its rubber-like elasticity at the beginning of the heating.

EXAMPLE 14

Two compositions were prepared with the same formulation as in Example 13 with the exception of the use of 8.0 g each of propyl orthosilicate or ethylpolysilicate 40 as the crosslinking agent instead of toluene diisocyanate. The compositions were transparent in appearance and can be cured by heating at 50° C. for 24 hours into either a rubber-like elastomer having a hardness value of 25 with clarity and free of tackiness when the crosslinking agent was propyl orthosilicate or a rubber-like elastomer having a hardness value of 28 with clarity but with slight tackiness when the crosslinking agent was ethylpolysilicate 40.

For comparison, two similar compositions were prepared in the same manner but with the butadiene copolymer Poly bd CS-15 instead of the silicon-containing derivative. These comparative compositions were white and opaque as blended and exhibited a tendency to segregation when stored.

EXAMPLE 15

A master blend was prepared by admixing 100 parts by weight of the same silicon-containing derivative of butadiene copolymer with regenerated hydroxy groups as used in Example 13 and 20 parts by weight of a fumed silica Silanox 101, followed by kneading of a three-roller mill. Compositions A, B and C were prepared by blending 100 parts by weight each of the above master blend with 5.6 parts by weight of phenyltriethoxysilane and 0.3 part by weight of dibutyltin dilaurate to form composition A, with 1.7 parts by weight of 1,3,5,7-tetramethyl-1,3,5-tripropyl-7-diethylaminoxy cyclotetrasiloxane and 15.0 parts by weight of 1,3,5,7-tetramethyl-1,5-dipropyl-3,7-bis(dimethylaminoxy) cyclotetrasiloxane to form composition B or with 2.2 parts by weight of toluene diisocyanate and 0.3 part by weight of dibutyltin dilaurate to form composition C.

After 3 days of standing at room temperature, these compositions became cured into rubber-like elastomers with the following mechanical properties.

|  | Composition | | |
|---|---|---|---|
|  | A | B | C |
| Hardness | 25 | 34 | 30 |
| Tensile strength, kg/cm$^2$ | 10 | 13 | 14 |
| Elongation at break, % | 150 | 120 | 130 |

By way of comparison, a similar composition was prepared by blending 100 parts by weight of the butadiene copolymer Poly bd CS-15 as such, 20 parts by weight of the same fumed silica, 14.6 parts by weight of phenyltriethoxysilane and 0.3 part by weight of dibutyltin dilaurate. The comparative composition was found uncured even on prolonged standing at room temperature over a week.

EXAMPLE 16

The silicon-containing derivative of the butadiene copolymer Poly bd CS-15 prepared in Example 3 was subjected to a hydrolysis treatment in a similar manner to that in Example 13 to regenerate the terminal hydroxy groups, followed by reaction with 26% by weight, i.e., about 3.5 times the stoichiometric amount, of toluene diisocyanate under a reduced pressure of 50 mmHg in an anhydrous condition to produce an isocyanate-endblocked derivative. The content of free toluene diisocyanate in the reaction mixture was 14.8% by weight.

Into 100 parts by weight of the thus produced isocyanate-endblocked derivative containing the excess toluene diisocyanate were added 36 parts by weight of N,N-bis(2-hydroxypropyl)aniline Isonol C-100 (product of The Upjohn Co.) and 0.1 part by weight of dibutyltin dilaurate to form a composition, which became cured by heating at 90° C. for 60 minutes into a rubber-like elastomer having a hardness value of 80, a tensile strength of 120 kg/cm$^2$ and an elongation at break of 300%. This cured product retained its elasticity even by heating at 120° C. in an air oven for more than 10 days.

EXAMPLE 17

A silicon-containing derivative of the butadiene polymer Nisso PB G-1000 was prepared by a two-step addition reaction with different organosilicon compounds having silicon-bonded hydrogen atoms. The first step of the addition reaction was conducted by use of pentamethyldisiloxane with which 70% of the double bonds originally present in the starting butadiene polymer became saturated. The second step of the addition reaction was conducted by use of dimethylchlorosilane with which 1% of the double bonds became saturated. The resulting addition reaction product was subjected to hydrolysis to convert the silicon-bonded chlorine atoms to hydroxy groups. Thus obtained silicon-containing product had a viscosity of 10,000 centipoise at 25° C. which corresponded to about one fourth of the viscosity of the starting butadiene polymer.

A composition then prepared by blending 100 parts by weight of the above product, 15 parts by weight of phenyltriethoxysilane and 1.0 part by weight of lead dioctoate was cured by heating at 100° C. for 3 hours into a rubber-like elastomer having a hardness value of 32, a tensile strength of 12 kg/cm$^2$ and an elongation at break of 80%.

For comparison, a similar composition prepared with the same starting butadiene polymer as such, propyl orthosilicate and bibutyltin dilaurate was heated but to a gelled mass, and no rubber-like elastomers could be formed. This is presumably because of an insufficient amount of the hydroxy groups, i.e. 1.6 hydroxy groups per molecule, as the crosslinkably functional groups in the butadiene polymer employed.

EXAMPLE 18

A hydroxy-terminated 1,4-polybutadiene Poly bd R-45HT (product of Idemitsu Petrochemical Co., Japan) was subjected to an addition reaction by use of pentamethyldisiloxane with which 60% of the double bonds originally present in the starting butadiene polymer became saturated. A composition was prepared by uniformly blending 100 parts by weight of the thus obtained silicon-containing derivative, 7 parts by weight of phenyltriethoxysilane, 130 parts by weight of finely divided quartz powder and 0.23 part by weight of dibutyltin dilaurate. This composition could be cured by standing at room temperature for 7 days into a rubber-like elastomer having a hardness value of 55, a tensile strength of 18 kg/cm$^2$, an elongation at break of 90%, a volume resistivity of $7.8 \times 10^{14}$ ohm-cm and a breakdown voltage of 24 kV/mm.

What is claimed is:

1. A derivative of a polybutadiene or a copolymer of butadiene in the liquid state with one or more copolymerizable monomers having in one molecule at least 15 mole % of all butadiene monomer units to which are bonded, through carbon-to-silicon linkages, silicon-containing groups having the general formula $(CH_3)_3Si-O-(CH_3)_2Si-$.

2. The derivative as claimed in claim 1 wherein the butadiene monomer unit has a structure of 1,2-polybutadiene.

3. The derivative as claimed in claim 1 wherein the butadiene monomer unit has a structure of 1,4-polybutadiene.

4. The derivative as claimed in claim 1 wherein the copolymerizable monomer is styrene.

* * * * *